(12) United States Patent
Stiesdal

(10) Patent No.: US 8,402,718 B2
(45) Date of Patent: Mar. 26, 2013

(54) WIND TURBINE INSTALLATION

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/075,706

(22) Filed: Mar. 30, 2011

(65) Prior Publication Data

US 2011/0239586 A1 Oct. 6, 2011

(30) Foreign Application Priority Data

Mar. 31, 2010 (EP) .................................. 10158643

(51) Int. Cl.
*E04C 3/00* (2006.01)

(52) U.S. Cl. ............... 52/845; 52/831; 52/846; 52/847; 52/848; 52/849; 52/854

(58) Field of Classification Search ............ 52/845, 52/831, 834, 843, 844, 846, 847, 848, 849, 52/854
See application file for complete search history.

(56) References Cited

U.S. PATENT DOCUMENTS

| | | | | |
|---|---|---|---|---|
| 900,517 | A * | 10/1908 | Glover | 52/298 |
| 4,079,959 | A * | 3/1978 | Vance | 280/432 |
| 7,159,370 | B2 * | 1/2007 | Oliphant et al. | 52/845 |
| 7,392,624 | B2 * | 7/2008 | Kinzer | 52/194 |
| 8,196,358 | B2 * | 6/2012 | Shiraishi | 52/40 |
| 8,209,913 | B2 * | 7/2012 | Murata | 52/40 |
| 2006/0236648 | A1 * | 10/2006 | Grundman et al. | 52/726.4 |
| 2006/0272244 | A1 * | 12/2006 | Jensen | 52/223.5 |
| 2007/0251187 | A1 * | 11/2007 | Schiffer et al. | 52/741.14 |
| 2007/0294955 | A1 * | 12/2007 | Sportel | 52/40 |
| 2008/0041009 | A1 * | 2/2008 | Cairo et al. | 52/651.07 |
| 2008/0256892 | A1 * | 10/2008 | Franke | 52/655.1 |
| 2008/0308696 | A1 | 12/2008 | Kristensen | |
| 2009/0021019 | A1 * | 1/2009 | Thomsen | 290/55 |
| 2009/0255200 | A1 * | 10/2009 | Leon Perfecto | 52/298 |
| 2010/0024311 | A1 * | 2/2010 | Wambeke et al. | 52/40 |
| 2010/0071275 | A1 * | 3/2010 | Mathai et al. | 52/40 |
| 2011/0283652 | A1 * | 11/2011 | Haridasu et al. | 52/651.01 |

FOREIGN PATENT DOCUMENTS

| | | |
|---|---|---|
| EP | 2 006 471 A1 | 12/2008 |
| EP | 2 048 357 A2 | 4/2009 |
| WO | WO 00/71856 A1 | 11/2000 |
| WO | WO 2004/090263 A1 | 10/2004 |
| WO | WO 2005/095792 A1 | 10/2005 |

\* cited by examiner

*Primary Examiner* — Mark Wendell

(57) ABSTRACT

A wind turbine installation is provided. The installation includes a wind turbine tower or tower section, a receiving part of a wind turbine foundation installation, connection means suitable for connecting the wind turbine tower or tower section to the receiving part, whereby a lower end of the wind turbine tower or the tower section is flange-less.

15 Claims, 5 Drawing Sheets

WIND TURBINE INSTALLATION

CROSS REFERENCE TO RELATED APPLICATIONS

This application claims priority of European Patent Office Application No. 10158643.6 EP filed Mar. 31, 2010, which is incorporated by reference herein in its entirety.

FIELD OF INVENTION

The present invention relates to a wind turbine installation comprising a wind turbine tower or tower section, a receiving part of a wind turbine foundation installation and connection means suitable for connecting the wind turbine tower or tower section to the receiving part.

BACKGROUND OF INVENTION

Tubular steel towers for wind turbine installations are large in diameter and weight. Their size causes difficulties concerning the transportation of a tower to a wind farm. Usually, the steel towers for wind turbines are produced as sections in a shop and the sections are transported to the place of installation. The towers are typically constructed of a number of sections which have a cylindrical or conical shape.

In recent years larger turbines have been developed which require larger wind turbine towers. Consequently the diameters of tower sections have been increased and tower sections are becoming longer and heavier. The dimensions of tall towers for large wind turbines have reached limits defined by the infrastructure for transportation. The limiting aspects are typically physical limits such as free height under bridges and tunnels, allowable weights or the turning radii of roundabouts.

Various ways of connecting tower segments are known. In WO 02/077397 A1 a connecting flange has been disclosed for tower sections with a conical shape. The two connected flanges are fixed by bolts.

In US 2008/0308696 A1 a connection for wind turbine tower sections has been proposed, where each section is provided with flanges at its ends, the flanges are being connected by bolts and nuts.

From WO 2009/103475 an example for a connection between the bottom segment of the wind turbine tower to a foundation is known.

In EP 2 006 471 A1 a wind turbine tower has been proposed with sections with a polygonal cross-section, whereby each segment comprises a number of flat plates which form the polygonal cross-section.

SUMMARY OF INVENTION

It is an object of the present invention to provide an advantageous wind turbine tower which is not limited by transportation restrictions.

According to the present invention, this object is achieved in the above defined wind turbine tower in that the lower end of the wind turbine tower or tower section is flange-less.

The invention is based on the idea that a wind turbine tower or tower sections can be used which are flange-less, in order to facilitate transport to the place of installation. A flange-less lower end of the wind turbine tower or a tower section can be deformed elastically for transport in order to decrease the height or the width. At the place of installation the wind turbine tower or the tower sections can be deformed back to the original e.g. circular shape. The connection means ensures a tight and stable connection between the wind turbine tower or the tower section and the receiving part which is able to withstand all loads.

According to the invention it is preferred that the connection means is bolted or welded to the flange-less lower end and/or the receiving part. In both cases the connection means is tightly connected to the flange-less lower end of the wind turbine tower or the tower section so that the loads are transferred through the connection means to the receiving part. In a similar way it is possible to connect two tower sections with each other by a connection means.

According to a further development of the invention the receiving part is segmented. A segmented receiving part can be transported more easily similar to the flange-less tower sections.

Preferably the receiving part of the wind turbine installation according to the invention is a foundation flange or a transition piece of the foundation installation. The foundation flange or the transition piece are used to connect the flange-less wind turbine tower or the tower section to the foundation installation. In this regard the transition piece serves as an adapter piece for connecting the tower to the foundation.

In the inventive wind turbine installation it is preferred that the receiving part or the transition piece comprises at least one vertical section for connecting with the flange-less lower end. The vertical section of the receiving part or the transition piece can be bolted or welded with the lower end so that a stable connection is realised.

According to an embodiment of the inventive wind turbine installation the at least one vertical section is connected by an H-profile as connecting means. The flange-less lower end and the vertical section can be inserted into the space between the two parallel sections of the H-profile.

According to another embodiment of the wind turbine installation according to the invention the receiving part or the end section of the transition piece is formed as a C-profile with two vertical sections between which the flange-less lower end is inserted. The C-profile can be attached directly on the foundation with its centre section.

According to another embodiment of the wind turbine installation according to the invention the connecting means is formed as an L-profile with a horizontal and a vertical section to which the flange-less lower end is attached.

It is preferred that the connection means is made out of steel. This material is in particular preferred when the sections are made of steel as well.

Preferably the wind turbine installation according to the invention comprises a wind turbine tower or tower sections which are segmented. The sections can have a polygonal cross-section, comprising a number of splice plates connected to each other so as to form the polygonal cross-section.

The invention and its underlying principle will be better understood when consideration is given to the following detailed description of preferred embodiments.

DETAILED DESCRIPTION OF INVENTION

Figure 1:
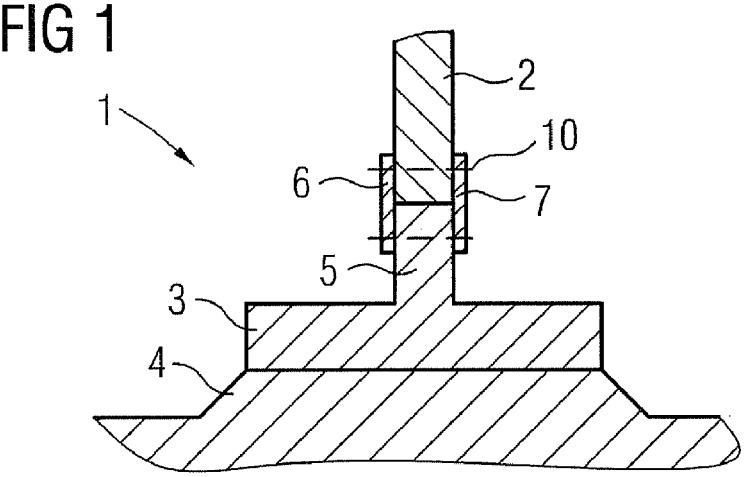
FIGS. 1-3 are schematic representations of embodiments of an inventive wind turbine tower.

FIG. 1 shows a section of a wind turbine tower 1 consisting of a number of connected sections 2, each section 2 has a tubular shape. The lower end of section 2 is formed flange-less. The section 2 is connected to a wind turbine foundation installation comprising a receiving part, which is formed as a foundation flange 3. The foundation flange 3 is fixed to a foundation 4, the cross-section of the foundation flange 3 is a T-profile with a vertical section 5. Two splice plates 6, 7 serve as connection means for connecting the flange-less lower end of section 2 to the vertical section 5. The section 2 and the vertical section 5 are provided with radial holes so that the splice plates 6, 7 can be fixed with bolts and nuts, as is indicated by a dashed line 10. In other embodiments the splice plates may be welded to the section 2 and the vertical section 5 of the foundation flange 3.

Figure 2:
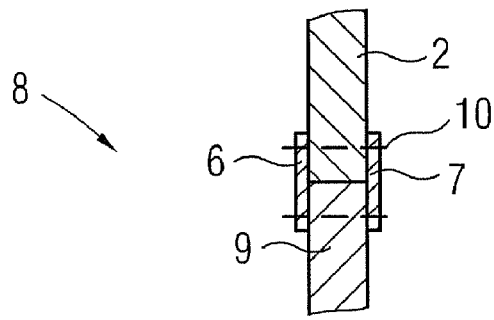

FIG. 2 shows a similar embodiment of a wind turbine tower 8 where the receiving part is a transition piece 9 of the foundation installation of the wind turbine tower installation. In accordance with the previous embodiment splice plates 6, 7 are used as connection means in order to realise a connection with section 2. For the connection bolts and nuts are used as is indicated by a dashed line 10.

Figure 3:
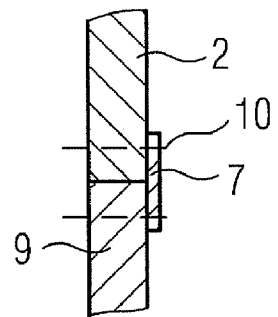

FIG. 3 shows a similar embodiment where a transition piece 9 is connected to a section 2 through a single splice plate 7 as connection means. In contrast to the previous embodiment only one single splice plate 7 is used for connecting the transition piece 9 of the foundation installation to the flange-less lower end of section 2.

Figure 4:
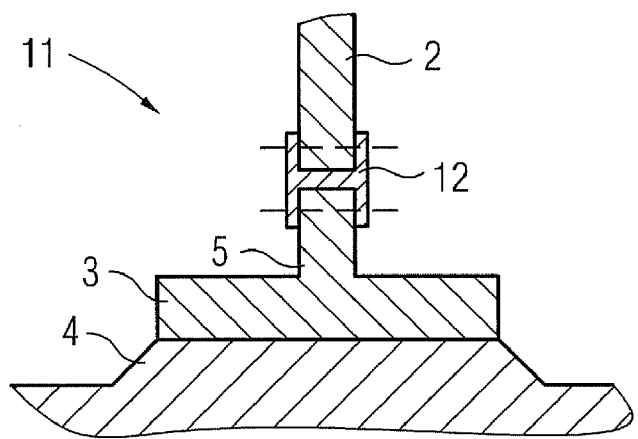
FIGS. 4-7 are embodiments of a segment of an inventive wind turbine tower where the connecting means is an H-profile.
Figure 5:
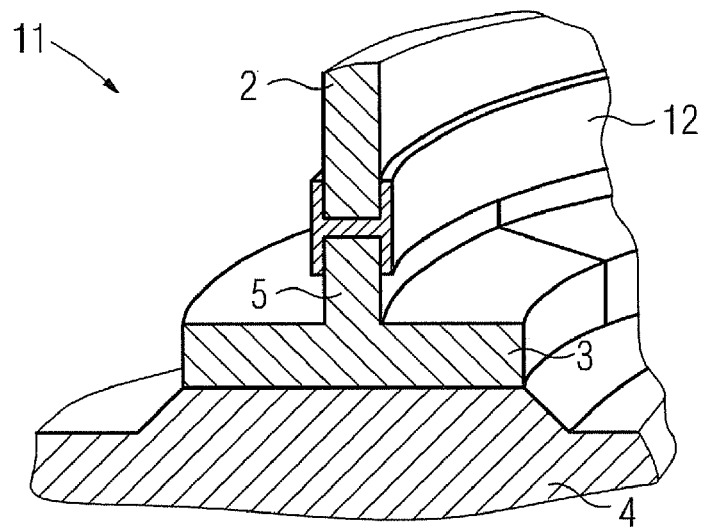

FIGS. 4 and 5 show another embodiment of a wind turbine tower 11 where the connection means is formed as an H-profile 12. The vertical section 5 of the foundation flange 3 and the lower flange-less end of section 2 are inserted into the space between the parallel sections of the H-profile 12. In the perspective view of FIG. 5 it can be seen that the foundation flange 3 is segmented and that plural segments form the circular foundation flange 3.

Figure 6:
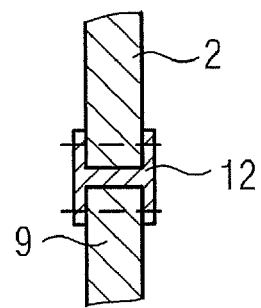
Figure 7:
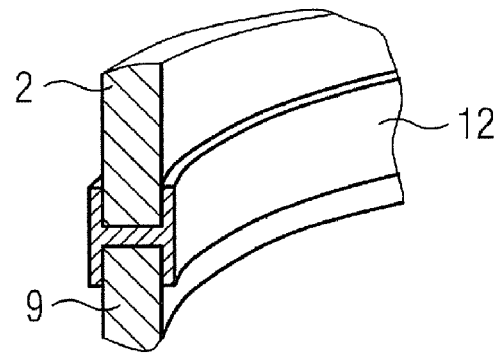

FIG. 6 shows a similar embodiment where a transition piece 9 is connected to a flange-less section 2 by an H-profile 12 as connection means. FIG. 7 shows the embodiment of FIG. 6 in a perspective view.

Figure 8:
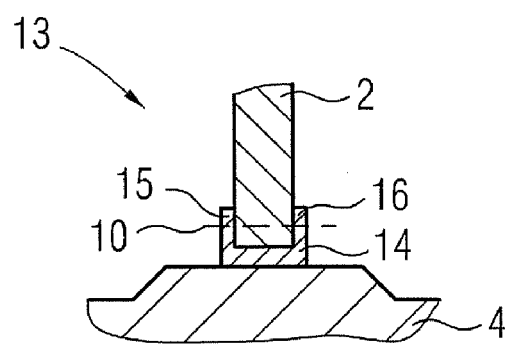
FIGS. 8 and 9 are embodiments of a section of an inventive wind turbine tower where the connecting means is a C-profile.

FIG. 8 shows another embodiment of a wind turbine tower 13 where the receiving part is formed as a C-profile 14. The C-profile 14, which is used as connection means, is fixed to the foundation 4. The lower end section 2 is inserted between vertical sections 15, 16 and fixed by bolts and nuts as indicated by the dashed line 10.

Figure 9:
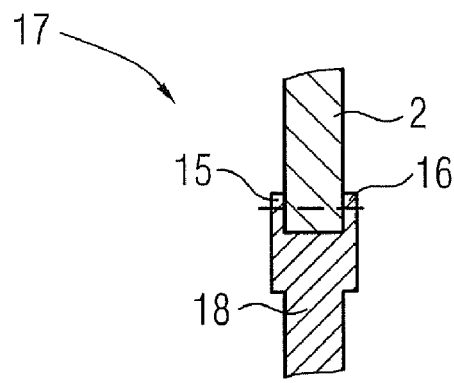

FIG. 9 shows a similar embodiment of a wind turbine tower 17, where the upper end of the transition piece 18 is formed as a C-profile. The flange-less lower end section 2 is inserted between two vertical sections 15, 16 which are fixed by bolts and nuts.

Figure 10:
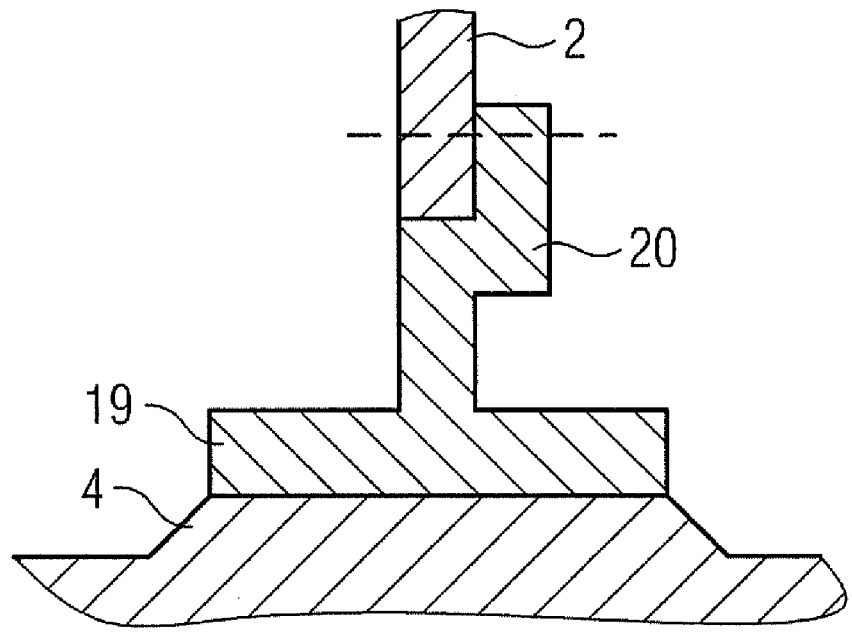
FIGS. 10 and 11 are embodiments of an inventive wind turbine tower where the connection means is a bent portion of the receiving part or the transition piece.

FIG. 10 shows another embodiment where the foundation flange 19 which is used as receiving part comprises a bent section 20 as connection means in order to connect the receiving part to the lower end of the flange-less section 2.

Figure 11:
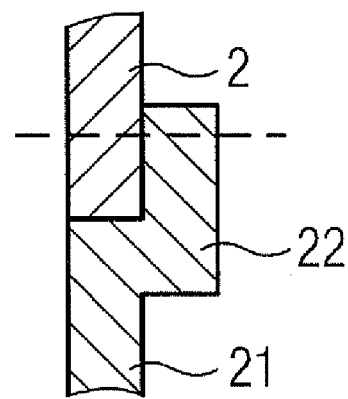

FIG. 11 shows a similar embodiment where a transition piece 21 with a bent section 22 is used as connection means in order to realise a connection with section 2.

Figure 12:
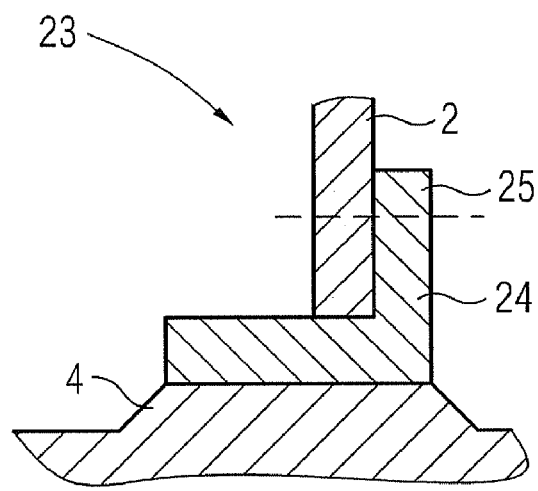
FIG. 12 is an embodiment where the connection means is formed as an L-profile.

FIG. 12 shows an embodiment of a wind turbine tower 23, where the connection means is formed as an L-profile with a horizontal and a vertical section to which the flange-less lower end of the section 2 is attached. The L-profile 24 serves as receiving part as well as the connection means. The section 2 is connected to the vertical section 25 of the L-profile 24 by nuts and bolts.

Figure 13:
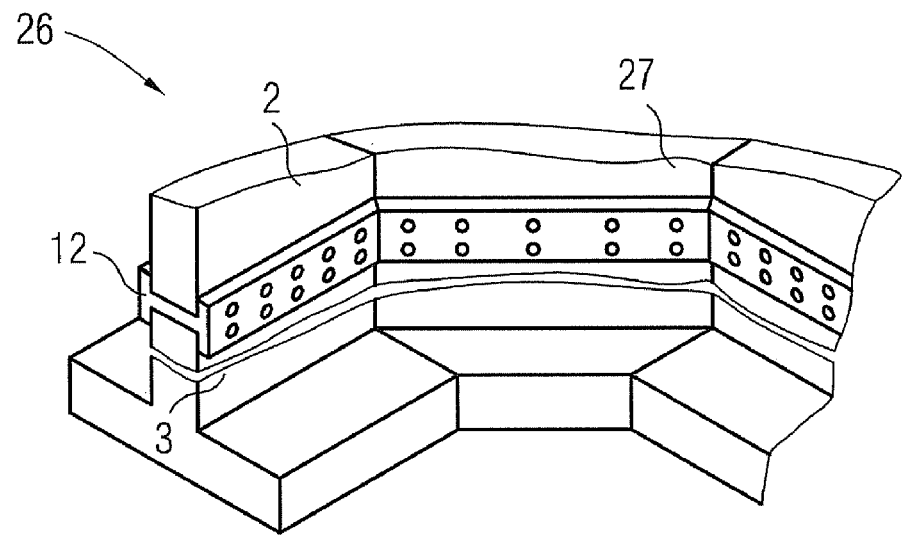
FIG. 13 is an embodiment with a polygonal cross-section.

FIG. 13 shows a section of a wind turbine tower 26 with sections 2 and foundation flanges 3 with a polygonal cross-section. Each section is assembled out of six or eight flat plates 27, which are connected to form the annular section 2. Similarly six or eight foundation flanges 3 are connected to form the circular foundation flange. An H-profile 12 is used as connection means so that the wind turbine tower 26 with polygonal cross-section is formed.

The invention claimed is:

1. A wind turbine installation, comprising:
a wind turbine tower or tower section;
a receiving part of a wind turbine foundation installation, wherein the receiving part is formed as a circular foundation flange,
a connection device suitable for connecting the wind turbine tower or tower section to the receiving part,
wherein a lower end of the wind turbine tower or the tower section is flange-less, wherein the foundation flange comprises at least one vertical section for connecting to the flange-less lower end,
wherein the at least one vertical section is connected by an H-profile as connecting device.

2. The wind turbine installation according to claim 1, wherein the connection device is bolted or welded to the flange-less lower end.

3. The wind turbine installation according to claim 1, wherein the connection device is bolted or welded to the receiving part.

4. The wind turbine installation according to claim 1, wherein the receiving part is segmented.

5. The wind turbine installation according to claim 1, wherein the connection device is made out of steel.

6. A wind turbine installation, comprising:
a wind turbine tower or tower section;
a receiving part of a wind turbine foundation installation, wherein the receiving part is formed as a circular foundation flange,
a connection device suitable for connecting the wind turbine tower or tower section to the receiving part,
wherein a lower end of the wind turbine tower or the tower section is flange-less, wherein the foundation flange comprises at least one vertical section for connecting to the flange-less lower end,
wherein the foundation flange is foamed as a C-profile with two vertical sections, the flange-less lower end being inserted between the two vertical sections.

7. The wind turbine installation according to claim 6, wherein the connection device is made out of steel.

8. The wind turbine installation according to claim 6, wherein the connection device is bolted or welded to the flange-less lower end.

9. The wind turbine installation according to claim 6, wherein the connection device is bolted or welded to the receiving part.

10. The wind turbine installation according to claim 6, wherein the receiving part is segmented.

11. A wind turbine installation, comprising:
a wind turbine tower or tower section;

a receiving part of a wind turbine foundation installation, wherein the receiving part is formed as a circular foundation flange,
a connection device suitable for connecting the wind turbine tower or tower section to the receiving part,
wherein a lower end of the wind turbine tower or the tower section is flange-less, wherein the foundation flange comprises at least one vertical section for connecting to the flange-less lower end,
wherein the connection device is formed as an L-profile with a horizontal and a vertical section to which the flange-less lower end is attached.

12. The wind turbine installation according to claim 11, wherein the connection device is made out of steel.

13. The wind turbine installation according to claim 11, wherein the connection device is bolted or welded to the flange-less lower end.

14. The wind turbine installation according to claim 11, wherein the connection device is bolted or welded to the receiving part.

15. The wind turbine installation according to claim 11, wherein the receiving part is segmented.

* * * * *